No. 894,944. PATENTED AUG. 4, 1908.
M. FISCHER.
INDUCTION CURRENT GENERATOR.
APPLICATION FILED NOV. 20, 1903.
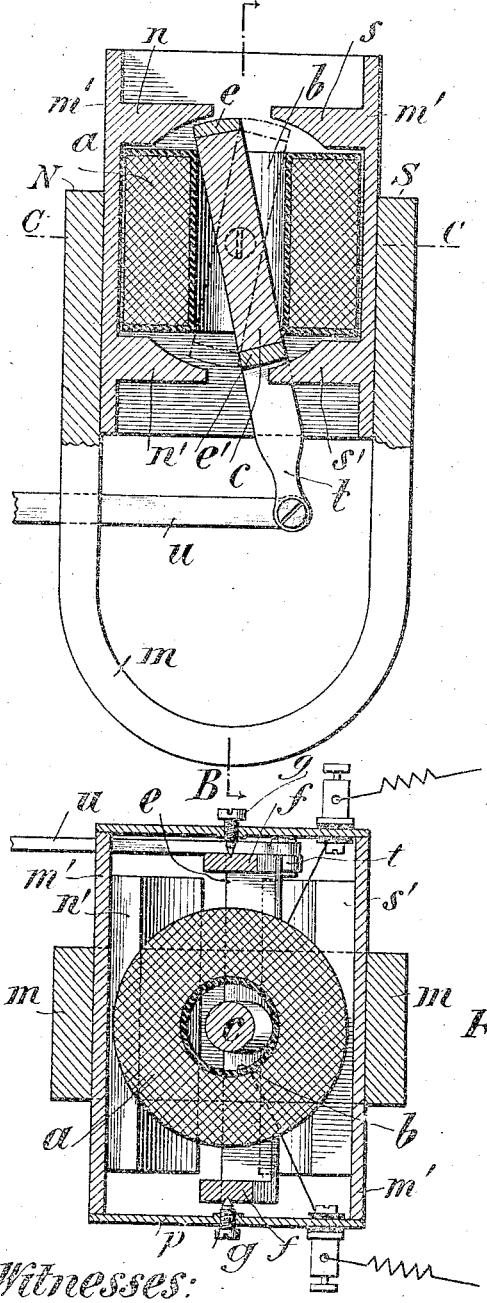
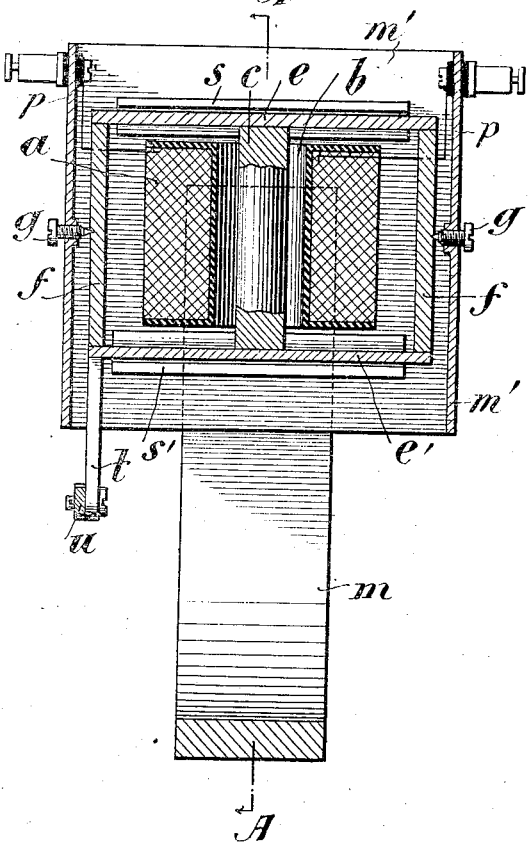
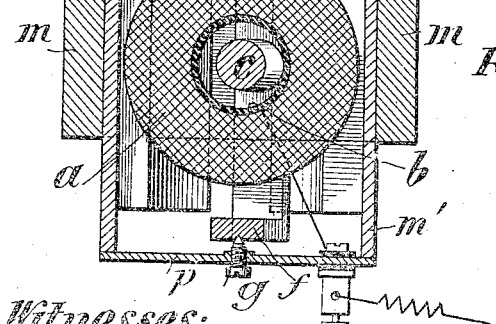
Witnesses:
Inventor:
Martin Fischer

UNITED STATES PATENT OFFICE.

MARTIN FISCHER, OF ZURICH, SWITZERLAND, ASSIGNOR TO THE FIRM OF ACTIENGESELL-SCHAFT "MAGNETA" (ELECTRISCHE UHREN OHNE BATTERIE & OHNE CONTACTE), OF ZURICH, SWITZERLAND.

INDUCTION-CURRENT GENERATOR.

No. 894,944.  Specification of Letters Patent.  Patented Aug. 4, 1908.

Application filed November 20, 1903. Serial No. 181,976.

*To all whom it may concern:*

Be it known that I, MARTIN FISCHER, a citizen of the Republic of Switzerland, residing at Zurich, in Switzerland, have invented a new and useful Improvement in Induction-Current Generators, of which the following is a specification.

My invention has relation to that type of induction current generator in which the induction coil and magnetic field are both stationary, while the magnetic conductor or pole changer is capable of oscillation in the magnetic field, and is so positioned relatively to the poles of a permanent field magnet that reversal of its position will produce reversal of polarity, and change in the direction of the lines of force passing through the coil.

The characteristic feature of my invention lies in the relative arrangement of the induction coil and pole changer, whereby the area of its poles may be given any desired extent relatively to the induction coil and field magnet poles, with a view to the utmost utilization of the induction action. But that my invention may be fully understood, I will now describe the same in detail, reference being had to the accompanying drawings, in which—

Figure 1 is a vertical sectional view on line A—A of Fig. 2, which latter is a vertical section on line B—B of Fig. 1, and Fig. 3 is a horizontal section on line C—C of said Fig. 1, of an induction current generator embodying my invention.

Similar letters of reference indicate like parts wherever such may occur in the several figures of drawings, wherein $m$ indicates the permanent or field horseshoe magnet, having pole extensions in the form of rectangular plates $m'$ provided intermediate their upper and lower edges with two pairs of pole shoes, $n\ s$, and $n'\ s'$, whose proximate faces are arcs of a circle having for center the axis of rotation of a magnetic conductor or pole changer.

To the pole extensions $m'$ are secured bridges or plates $p$, having diametrically disposed internally threaded screw bearings for cone screws $g$ on which the pole changer is mounted to vibrate, and between the two pairs of field magnet poles $n\ s$ and $n'\ s'$ is located the stationary induction coil which surrounds the pole changer.

The pole changer is composed of, preferably, a cylindrical bar $c$ having at each end a pole piece or shoe, indicated by $e$ and $e'$ respectively, whose outer faces are arcs of a circle having also for center the axis of oscillation of the pole changer, and vibrate in close proximity to the corresponding faces of the pole shoes $n\ s$ and $n'\ s'$, respectively, of the field magnet pole extensions $m'$.

The pole pieces $e$ and $e'$ are connected by bars $f$, which latter are mounted on the afore-mentioned cone screws $g$ in the bridges $p$. The lower pole piece $e'$ of the pole changer has a downward extension or arm $t$, to which is pivoted a rod $u$ reciprocated by any suitable motor, either continuously or periodically, according to the uses made of the generator. It is obvious that each reversal of the position of the armature will produce a reversal of polarity, or change in the direction of the lines of force passing through the coil.

The described induced current generator may be applied to various uses, as, for instance, to electrically operate an indicator of any kind, or to operate secondary clocks in a system of time indicators, in which case the generator is operated by the master clock at suitable intervals of time, or by a driving mechanism controlled by the master clock. I am thus enabled to include a number of indicating devices in a permanently closed or loop circuit and dispense with electric contact devices, the disadvantages of which are well understood, and by the described construction I am also enabled to reduce the amplitude of the vibrations of the pole changer to a minimum, while comparatively little power is required to vibrate said pole changer.

Having thus described my invention, what I claim as new therein and desire to secure by Letters Patent, is:—

1. A magnetic inductor comprising in combination a horse-shoe magnet having two pair of poles, plates connecting the poles, a coil between the poles parallel to the legs of the magnet and having an axial opening therethrough, an armature in said opening, armature extensions on the ends of the armature extending over the ends of the coil, means at the side of the coil to connect the armature extensions, and pivots in said plates taking into said means at points between the ends of the coil.

2. A magnetic inductor comprising in combination a horse-shoe magnet having two pairs of poles, plates $m'$ connecting the poles at their ends thereby forming a substantially closed chamber, a coil mounted between the poles in said chamber whose axis is parallel to the legs of the magnet and having an opening therethrough, a core smaller than the opening through the coil, having extensions over the ends of the coil between the coil and poles, bars $f$ connecting the ends of the extensions, and pivots $g$ passing through plates $m'$ into the bars.

In testimony whereof I have signed my name to this specification in the presence of two subscribing witnesses.

MARTIN FISCHER.

Witnesses:
JAKOB C. BRUNNER,
A. LIEBERKNECHT.